US012724194B2

(12) United States Patent
Suganuma et al.

(10) Patent No.: US 12,724,194 B2
(45) Date of Patent: Sep. 1, 2026

(54) MULTI-CORE OPTICAL FIBER AND CORE IDENTIFICATION METHOD

(71) Applicant: SUMITOMO ELECTRIC INDUSTRIES, LTD., Osaka (JP)

(72) Inventors: Takahiro Suganuma, Osaka (JP); Takemi Hasegawa, Osaka (JP); Tetsuya Hayashi, Osaka (JP); Hirotaka Sakuma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 416 days.

(21) Appl. No.: 18/552,470

(22) PCT Filed: Mar. 29, 2022

(86) PCT No.: PCT/JP2022/015694
§ 371 (c)(1),
(2) Date: Sep. 26, 2023

(87) PCT Pub. No.: WO2022/210786
PCT Pub. Date: Oct. 6, 2022

(65) Prior Publication Data

US 2024/0176063 A1 May 30, 2024

(30) Foreign Application Priority Data

Apr. 1, 2021 (JP) ................................ 2021-063042

(51) Int. Cl.
*G02B 6/02* (2006.01)

(52) U.S. Cl.
CPC ................................ *G02B 6/02042* (2013.01)

(58) Field of Classification Search
CPC ........................................................ G02B 6/02
(Continued)

(56) References Cited

U.S. PATENT DOCUMENTS

2015/0043878 A1* 2/2015 Chen ................ B29D 11/00663 264/1.24
2015/0055923 A1* 2/2015 Saito .................... G02B 6/2555 65/378
(Continued)

FOREIGN PATENT DOCUMENTS

JP 2011150133 A * 8/2011 ......... G02B 6/02042
JP 2013-050695 A 3/2013
(Continued)

OTHER PUBLICATIONS

International Search Report issued in Patent Application No. PCT/JP2022/015694 dated May 17, 2022.

*Primary Examiner* — Kaveh C Kianni
(74) *Attorney, Agent, or Firm* — McDonald Hopkins LLC

(57) ABSTRACT

A multi-core optical fiber includes a plurality of cores extending along a fiber axis, a cladding including the plurality of cores formed in the cladding, the cladding having rotational symmetry with respect to the fiber axis excluding a portion of the cladding where the plurality of cores are located, and a coating surrounding the cladding and having rotational symmetry with respect to the fiber axis. The multi-core optical fiber has inversion asymmetry with respect to the fiber axis in a side observation image in at least one of two directions each of which is perpendicular to the fiber axis.

12 Claims, 8 Drawing Sheets

(58) Field of Classification Search
USPC .............................................................. 385/1
See application file for complete search history.

(56) References Cited

U.S. PATENT DOCUMENTS

| | | | | |
|---|---|---|---|---|
| 2015/0139597 | A1* | 5/2015 | Ishida | G02B 6/02 385/126 |
| 2015/0277032 | A1* | 10/2015 | Hayashi | G02B 6/02042 385/126 |
| 2016/0209583 | A1* | 7/2016 | Hayashi | G02B 6/02042 |
| 2016/0238783 | A1* | 8/2016 | Nagashima | G02B 6/02395 |
| 2017/0031121 | A1* | 2/2017 | Blazer | G02B 6/4404 |
| 2017/0199325 | A1* | 7/2017 | Saito | G02B 6/02042 |
| 2019/0033543 | A1* | 1/2019 | Freeland | G01H 9/004 |
| 2021/0263254 | A1* | 8/2021 | McAlpine | B29C 65/1648 |
| 2022/0113467 | A1* | 4/2022 | Hayashi | G02B 6/02347 |
| 2022/0120963 | A1* | 4/2022 | Hayashi | G02B 6/02009 |
| 2023/0185017 | A1* | 6/2023 | Hayashi | G02B 6/03611 385/126 |

FOREIGN PATENT DOCUMENTS

| | | | | |
|---|---|---|---|---|
| JP | 2015-099211 A | 5/2015 | | |
| JP | 2016-151716 A | 8/2016 | | |
| WO | 2000/016131 A2 | 3/2000 | | |
| WO | WO-2016027896 A1 * | 2/2016 | | G02B 6/255 |
| WO | 2016/084465 A1 | 6/2016 | | |

* cited by examiner

MULTI-CORE OPTICAL FIBER AND CORE IDENTIFICATION METHOD

TECHNICAL FIELD

The present disclosure relates to a multi-core optical fiber and a core identification method. This application claims priority to Japanese Patent Application No. 2021-063042 filed on Apr. 1, 2021, the entire contents of which are incorporated herein by reference.

BACKGROUND

When interference occurring between signals propagating through each core, that is, crosstalk is sufficiently small, each core can be regarded as an independent transmission path, and a multi-core optical fiber having such a core is classified into a non-coupling type fiber. In the non-coupling type fiber, since a plurality of cores in the same fiber act as independent transmission paths, a configuration for identifying the cores at both ends of the fiber is necessary. PTL 1 describes a multi-core optical fiber with a notch or a dummy core as a marker. PTL 2 describes a multi-core optical fiber in which cladding symmetry is impaired by a core group position being spaced apart from a cladding center by a predetermined distance.

PRIOR ART DOCUMENT

Patent Literature

PTL 1: WO 2000/016131
PTL 2: WO 2016/027896

SUMMARY

A multi-core optical fiber according to an embodiment of the present disclosure includes a plurality of cores extending along a fiber axis, a cladding including the plurality of cores formed in the cladding, the cladding having rotational symmetry with respect to the fiber axis excluding a portion of the cladding where the plurality of cores are located, and a coating surrounding the cladding and having rotational symmetry with respect to the fiber axis. The multi-core optical fiber has inversion asymmetry with respect to the fiber axis in a side observation image in at least one of two directions each of which is perpendicular to the fiber axis.

A multi-core optical fiber according to another embodiment of the present disclosure includes a plurality of cores extending along a fiber axis, a low-refractive-index portion provided in a circle, the circle being centered on the fiber axis and having a circumference passing through a center of one of the plurality of cores that is closest to the fiber axis, in a cross section perpendicular to the fiber axis, a cladding including the plurality of cores and the low-refractive-index portion formed in the cladding, the cladding having rotational symmetry with respect to the fiber axis excluding a portion of the cladding where the plurality of cores and the low-refractive-index portion are located, and a coating surrounding the cladding and having rotational symmetry with respect to the fiber axis. The multi-core optical fiber has inversion asymmetry with respect to the fiber axis in a side observation image in at least one of two directions each of which is perpendicular to the fiber axis.

DETAILED DESCRIPTION

Figure 1:
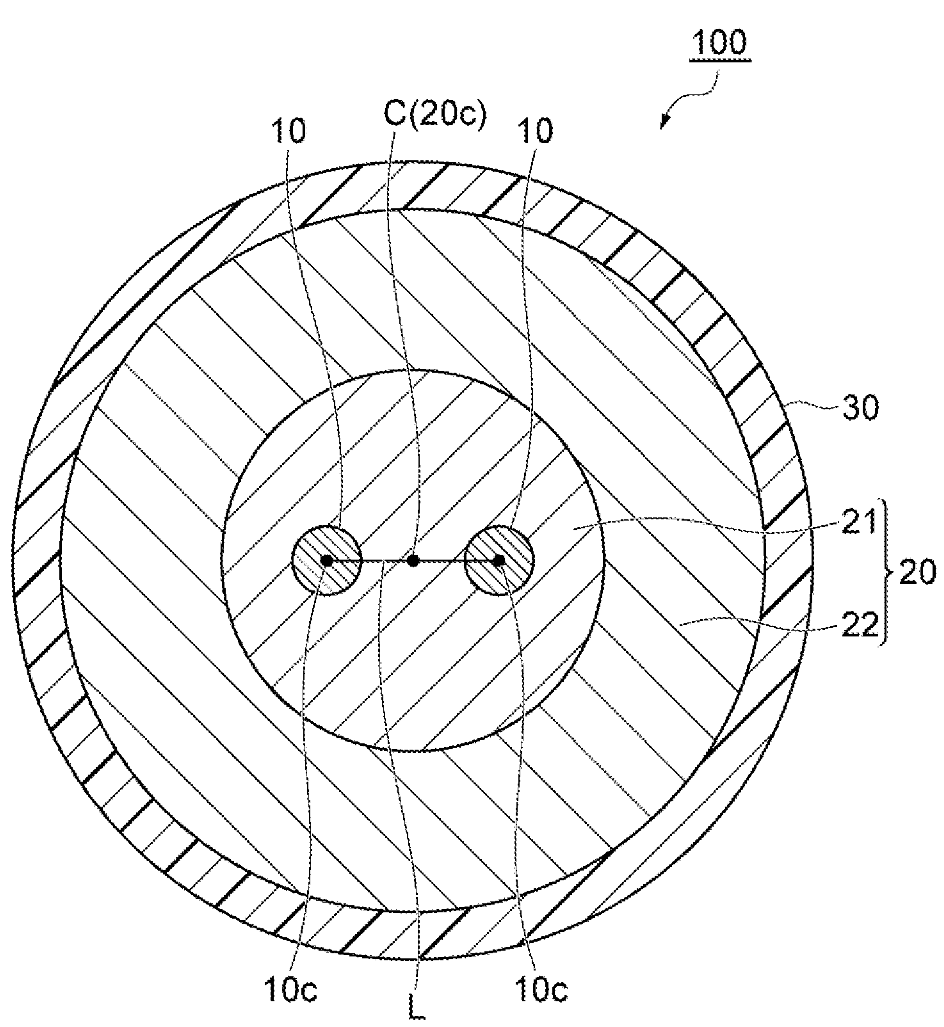
FIG. 1 is a cross-sectional view of a two-core optical fiber according to a comparative example.

Problems to be Solved by Present Disclosure

In the invention described in PTL 1, the marker not only complicates the manufacture of a fiber preform but also may affect the propagation characteristics of the signal propagating through the core. In the invention described in PTL 2, although the core can be identified by observing the cross section of the fiber, there is a case where it is difficult to observe the cross section of the fiber, for example, when the fiber is fused.

Accordingly, it is an object of the present disclosure to provide a multi-core optical fiber and a core identification method capable of identifying a core without using a marker or observing the cross section.

Advantageous Effects of Present Disclosure

According to the present disclosure, there are provided a multi-core optical fiber and a core identification method capable of identifying a core without using a marker or observing the cross section.

DESCRIPTION OF EMBODIMENTS OF PRESENT DISCLOSURE

First, embodiments of the present disclosure will be listed and explained. A multi-core optical fiber according to an embodiment of the present disclosure includes a plurality of cores extending along a fiber axis, a cladding including the plurality of cores formed in the cladding, the cladding having rotational symmetry with respect to the fiber axis excluding a portion of the cladding where the plurality of cores are located, and a coating surrounding the cladding and having rotational symmetry with respect to the fiber axis. The multi-core optical fiber has inversion asymmetry with respect to the fiber axis in a side observation image in at least one of two directions each of which is perpendicular to the fiber axis.

In the multi-core optical fiber according to an embodiment, the core can be identified by inversion asymmetry of the side observation image.

A centroid of a group of the plurality of cores may be spaced apart from the fiber axis in a cross section perpendicular to the fiber axis. Here, the "centroid of a group of cores" is a point having coordinates which are average values of the position coordinates of the center of each core on the cross section.

The plurality of cores may have an identical shape in the side observation image. Even in this case, the core can be identified by the inversion asymmetry based on the arrangement of the core.

At least one core of the plurality of cores may have a shape different from a shape of another core included in the plurality of cores in the side observation image. In this case, the core can be identified by inversion asymmetry based on the shape of the core.

The above multi-core optical fiber may include the following configuration. That is, the above multi-core optical fiber may further include a low-refractive-index portion having a refractive index lower than a refractive index of the cladding. The low-refractive-index portion may be disposed at a position overlapping the fiber axis in a cross section perpendicular to the fiber axis. The cladding, excluding a portion of the cladding where the plurality of cores and the low-refractive-index portion are located, may have rotational symmetry with respect to the fiber axis. In this case, crosstalk between signals propagating through the two cores sandwiching the low-refractive-index portion can be suppressed. As a result, the core-to-core distance required to ensure a certain crosstalk characteristic can be reduced, so that the connection loss caused by the rotational angle deviation around the fiber axis at the time of fiber connection can be reduced.

A multi-core optical fiber according to another embodiment of the present disclosure includes a plurality of cores extending along a fiber axis, a low-refractive-index portion provided in a circle, the circle being centered on the fiber axis and having a circumference passing through a center of one of the plurality of cores that is closest to the fiber axis, in a cross section perpendicular to the fiber axis, a cladding including the plurality of cores and the low-refractive-index portion formed in the cladding, the cladding having rotational symmetry with respect to the fiber axis excluding a portion of the cladding where the plurality of cores and the low-refractive-index portion are located, and a coating surrounding the cladding and having rotational symmetry with respect to the fiber axis. The multi-core optical fiber has inversion asymmetry with respect to the fiber axis in a side observation image in at least one of two directions each of which is perpendicular to the fiber axis.

In the multi-core optical fiber according to another embodiment, the core can be identified by inversion asymmetry of the side observation image.

The low-refractive-index portion may have an oval shape with a non-circularity of greater than 0% and 10% or less in a cross section perpendicular to the fiber axis. The non-circularity is defined as a value obtained by expressing a difference between a diameter of a circumscribed circle and a diameter of an inscribed circle of an object as a percentage with respect to an average diameter. In this case, by making the shape of the low-refractive-index portion flat, it is possible to narrow the interval between the core and the low-refractive-index portion compared to the case of a perfect circle while keeping the area of the low-refractive-index portion constant. Thus, the crosstalk suppression effect can be enhanced.

The non-circularity may be 6% to 10%. In this case, the interval between the core and the low-refractive-index portion can be further narrowed. Thus, the crosstalk suppression effect can be further enhanced.

The plurality of cores may be two cores.

A core identification method according to an embodiment of the present disclosure includes obtaining side observation images in two directions each of which is perpendicular to the fiber axis of the multi-core optical fiber and identifying the plurality of cores based on inversion asymmetry with respect to the fiber axis in each of the side observation images.

In the core identification method according to the above embodiment, the core can be identified by inversion asymmetry of the side observation image.

The two directions may be perpendicular to each other. In this case, inversion asymmetry of the side observation image can be detected most sensitively.

DETAILS OF EMBODIMENTS OF PRESENT DISCLOSURE

Specific examples of the multi-core optical fiber of the present disclosure will be described below with reference to the drawings. It should be noted that the present invention is not limited to these examples, but is defined by the scope of claims, and is intended to include all modifications within the meaning and scope equivalent to the scope of claims. In the description of the drawings, the same elements are denoted by the same reference numerals, and redundant description is omitted.

FIG. 1 is a cross-sectional view of a two-core optical fiber according to a comparative example. As shown in FIG. 1, a two-core optical fiber 100 according to the comparative example includes two cores 10, a cladding 20, and a coating 30.

Two cores 10 extend along a fiber axis C. Two cores 10 have an identical shape. Core 10 has a circular shape in a cross section perpendicular to fiber axis C (hereinafter also simply referred to as "cross section"). In the cross section, a line segment L connecting centers 10*c* of cores 10 passes through fiber axis C, and line segment L is bisected by fiber axis C. That is, in the cross section, fiber axis C forms a midpoint of line segment L, and distances from centers 10*c* of two cores 10 to fiber axis C are equal to each other. Core 10 is made of, for example, silica glass containing halogen such as chlorine. The glasses forming two cores 10 have, for example, the same composition. The glasses forming two cores 10 may have different compositions.

Cladding 20 is a common cladding that includes (surrounds) two cores 10. A center 20*c* of cladding 20 coincides with fiber axis C. Cladding 20 has rotational symmetry with respect to fiber axis C excluding a portion where two cores 10 are located. Cladding 20 includes an optical cladding 21 and a physical cladding 22. Optical cladding 21 includes two cores 10 and is provided in contact with the outer peripheral surfaces of two cores 10. Physical cladding 22 includes optical cladding 21 and is provided in contact with the outer peripheral surface of optical cladding 21.

Optical cladding 21 is made from, for example, silica glass containing fluorine. The refractive index of optical cladding 21 is lower than the refractive index of core 10. Physical cladding 22 is made from, for example, silica glass containing fluorine. The refractive index of physical cladding 22 is higher than the refractive index of optical cladding 21 and lower than the refractive index of core 10.

Coating 30 is provided on the outer peripheral surface of cladding 20. Coating 30 includes (surrounds) cladding 20 and is provided in contact with the outer peripheral surface of cladding 20. Coating 30 has rotational symmetry with respect to fiber axis C. Coating 30 is made from resin. Examples of the resin constituting coating 30 include a urethane acrylate-based ultraviolet curable resin.

Two-core optical fiber 100 is not provided with a notch or a dummy core functioning as a marker. In addition, two cores 10 have the identical shape and are disposed at positions that are rotationally symmetric with respect to fiber axis C in the cross section. Therefore, two cores 10 cannot be identified.

Figure 2:
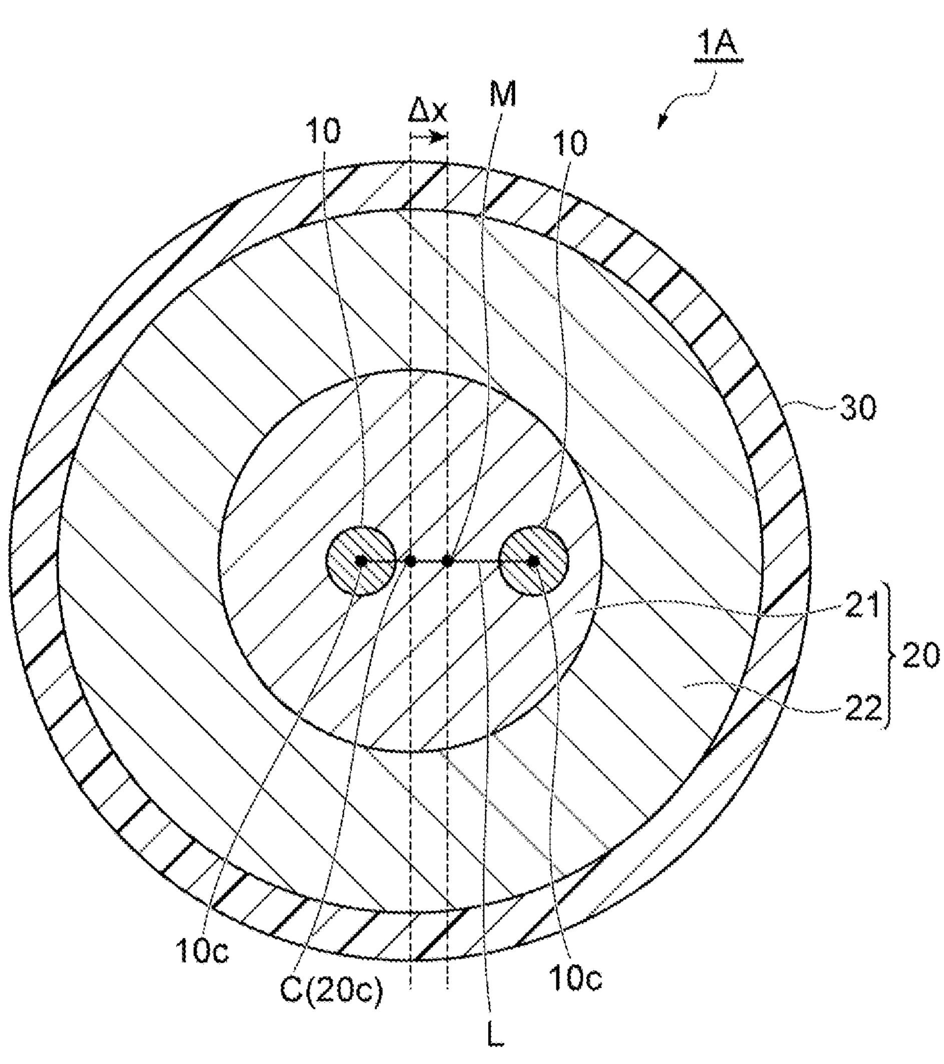
FIG. 2 is a cross-sectional view of a two-core optical fiber according to a first embodiment.

FIG. 2 is a cross-sectional view of a two-core optical fiber according to a first embodiment. As shown in FIG. 2, a two-core optical fiber 1A according to the first embodiment is different from two-core optical fiber 100 in the arrangement of two cores 10, and is identical to two-core optical fiber 100 in other respects. Two-core optical fiber 1A includes two cores 10 having an identical shape, cladding 20 including optical cladding 21 and physical cladding 22, and coating 30. No marker is provided in cladding 20, and cladding 20 has rotational symmetry with respect to fiber axis C excluding a portion where two cores 10 are located. Coating 30 has rotational symmetry with respect to fiber axis C. No notch is provided on the outer circumferential surface of coating 30, and the outer circumferential surface of coating 30 has rotational symmetry with respect to fiber axis C.

In two-core optical fiber 1A, two cores 10 are arranged at positions moved in parallel to line segment L so that the distance between a midpoint M of line segment L and fiber axis C is Δx in the cross section. That is, midpoint M of line segment L is spaced apart from fiber axis C (center 20*c* of cladding 20) by the distance Δx in a direction parallel to line segment L.

Next, a core identification method of two-core optical fiber 1A according to the embodiment of the present disclosure will be described with reference to FIG. 3. In the core identification method, side observation images are obtained in two directions perpendicular to fiber axis C, and two cores 10 are identified based on inversion asymmetry with respect to fiber axis C in the side observation images. Specifically, the core identification method includes a step of obtaining side observation images, a step of evaluating inversion symmetry of the obtained side observation images, and a step of identifying core 10 by using the side observation image evaluated as having no symmetry.

In the step of obtaining the side observation images, the two directions serving as observation directions are different from each other. The two directions are, for example, perpendicular to each other. The side observation image is, for example, a transmission image of two-core optical fiber 1A, and is obtained by irradiating two-core optical fiber 1A with parallel light parallel to the observation direction.

Figure 3:
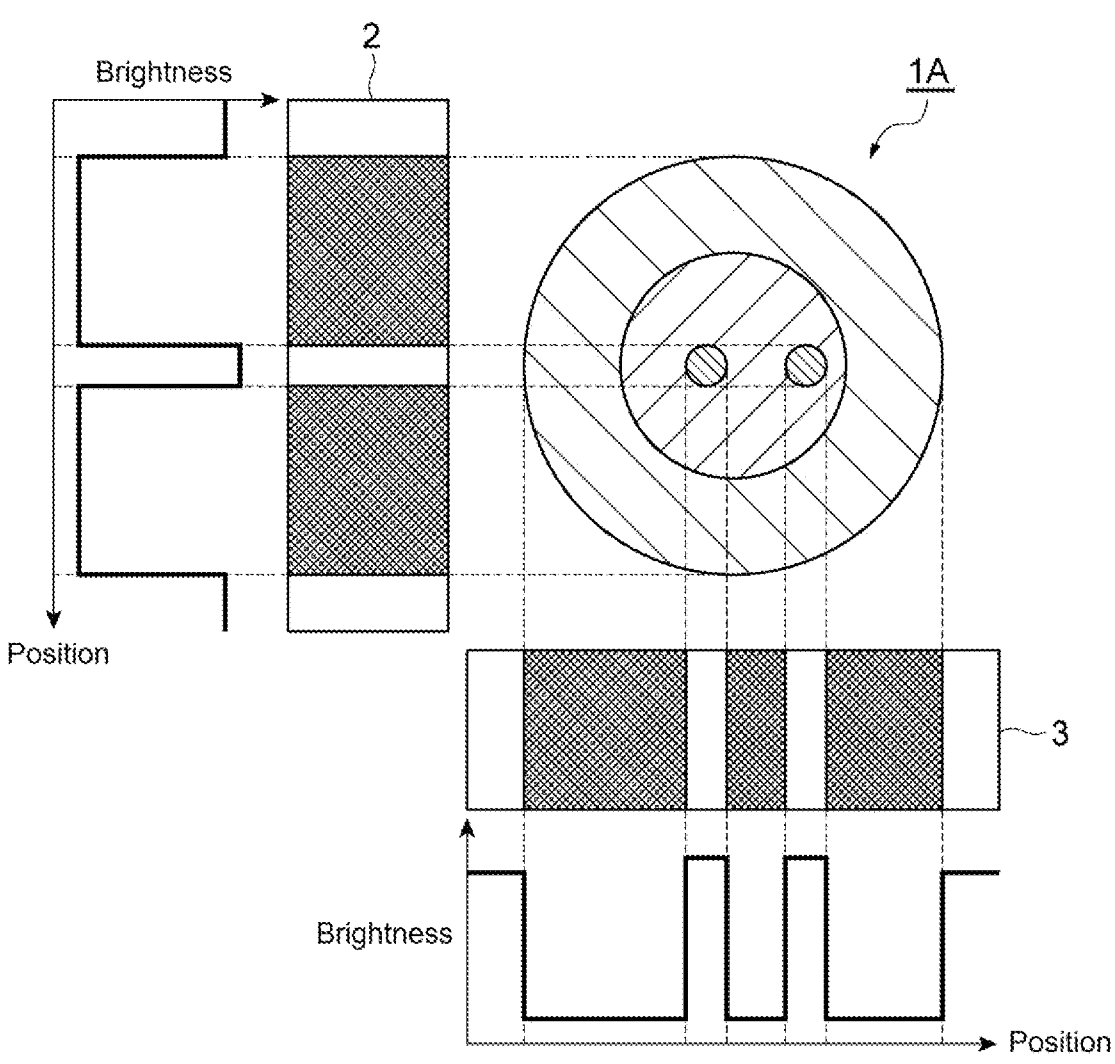
FIG. 3 is a diagram illustrating side observation images and brightness distributions of a two-core optical fiber according to the first embodiment.

FIG. 3 is a diagram illustrating side observation images and brightness distributions of a two-core optical fiber according to the first embodiment. In FIG. 3, coating 30 (see FIG. 2) is not shown. FIG. 3 shows side observation images 2 and 3 from two directions perpendicular to fiber axis C. Here, side observation images 2 and 3 are images obtained by side observation in directions orthogonal to each other. The observation direction of side observation image 2 is parallel to line segment L. The observation direction of side observation image 3 is orthogonal to line segment L.

Also, FIG. 3 shows brightness (luminance) distribution corresponding to each of side observation images 2 and 3. In each brightness distribution, a horizontal axis (an axis orthogonal to the observation direction) indicates a position in a radial direction, and a vertical axis (an axis parallel to the observation direction) indicates brightness. In the brightness distribution corresponding to side observation image 2, the horizontal axis is orthogonal to line segment L. In the brightness distribution corresponding to side observation image 3, the horizontal axis is parallel to line segment L. The brightness of the portion corresponding to core 10 is higher than the brightness of the portion corresponding to cladding 20.

In side observation image 2, since the observation direction is parallel to line segment L, two cores 10 are observed in a state of overlapping each other. Since line segment L passes through fiber axis C, both of two cores 10 overlap fiber axis C in side observation image 2. Two-core optical fiber 1A has inversion symmetry with respect to fiber axis C in side observation image 2.

In side observation image 3, since the observation direction is perpendicular to line segment L, two cores 10 are observed in a state of being spaced apart from each other. Since two cores 10 have an identical shape, they also have the identical shape (the same width) in side observation image 3, and cannot be distinguished from each other by their individual shapes. As described above, in two-core optical fiber 1A, two cores 10 are arranged at positions moved in parallel to line segment L. Therefore, two-core optical fiber 1A does not have inversion symmetry with respect to fiber axis C in side observation image 3.

In the step of evaluating the symmetry, for example, the side observation image is inverted by rotating two-core optical fiber 1A by 180 degrees with respect to fiber axis C, and the orthogonality (degree of overlap) of the brightness distributions before and after the inversion is evaluated. For example, the evaluation of the orthogonality is performed based on an inner product obtained by calculating an inner product of the brightness distributions before and after the inversion. The inner product increases as the degree of coincidence increases. For example, when the inner product is equal to or greater than a preset threshold value, it is determined to be inversion symmetric, and when the inner product is less than the threshold value, it is determined to be asymmetric. The threshold value is set to, for example, 60% of the maximum value of the inner product. The inner product has a maximum value for the same brightness distributions.

Two-core optical fiber 1A has inversion asymmetry with respect to fiber axis C in side observation image 3 in at least one of two directions each of which is perpendicular to fiber axis C. The inversion asymmetry of two-core optical fiber 1A in side observation image 3 is asymmetry that breaks the inversion symmetry with respect to fiber axis C. In the step of identifying, core 10 is identified using side observation image 3 evaluated as not having inversion symmetry. According to side observation image 3, two cores 10 which cannot be distinguished from each other by their individual shapes can be identified. As in two-core optical fiber 1A shown in FIG. 2, it is more preferable that a cross-sectional structure has symmetry about mirror image inversion. Thereby, the structures of the end faces of the two ends of the optical fiber can be congruent and both ends can have the same connectivity.

As described above, two-core optical fiber 1A has asymmetry that breaks the inversion symmetry with respect to fiber axis C in side observation image 3 in at least one of two directions each of which is perpendicular to fiber axis C. The core identification method obtains side observation images 2 and 3 from two directions perpendicular to fiber axis C of two-core optical fiber 1A, and identifies two cores 10 based on the inversion asymmetry of two-core optical fiber 1A with respect to side observation image 3.

By adding such a function of identifying core 10 to a multi-core optical fiber fusion splicer, core 10 can be identified without obtaining a cross-sectional image of two-core optical fiber 1A. In addition, since alignment around fiber axis C of two-core optical fiber 1A can be performed, fusion splicing loss between the multi-core optical fibers can be suppressed.

Figure 4:
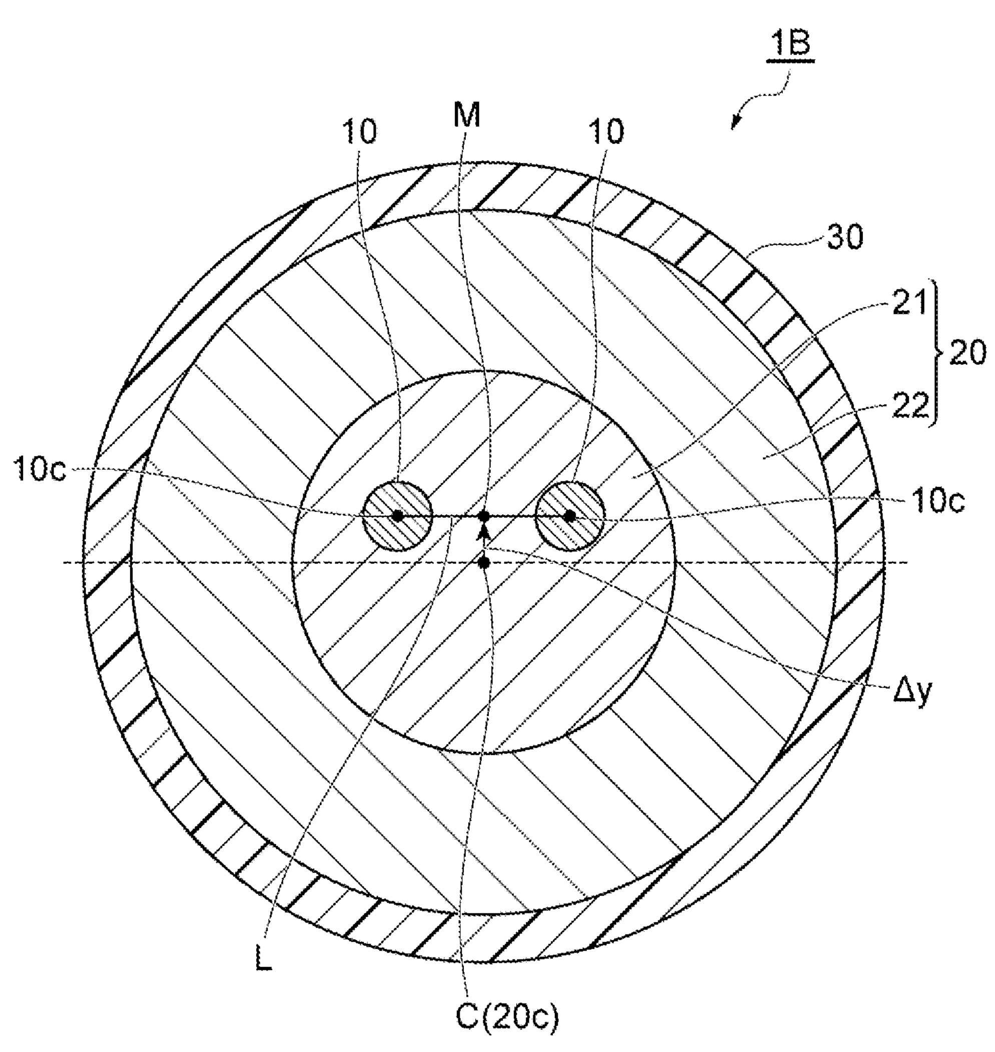
FIG. 4 is a cross-sectional view of a two-core optical fiber according to a second embodiment.

FIG. 4 is a cross-sectional view of a two-core optical fiber according to a second embodiment. As shown in FIG. 4, a two-core optical fiber 1B according to the second embodiment is different from two-core optical fiber 100 in the arrangement of two cores 10, and is the same as two-core optical fiber 100 in other respects. That is, two-core optical fiber 1B includes two cores 10 having an identical shape, cladding 20 including optical cladding 21 and physical cladding 22, and coating 30. Cladding 20 has rotational symmetry with respect to fiber axis C excluding a portion where two cores 10 are provided. Coating 30 has rotational symmetry with respect to fiber axis C.

In two-core optical fiber 1*i*, in the cross section, two cores 10 are arranged at positions moved perpendicularly to line segment L so that the distance between midpoint M of line segment L and fiber axis C is Δy. That is, midpoint M of line segment L is spaced apart from fiber axis C (center 20*c* of cladding 20) by the distance Δy in the direction orthogonal to line segment L.

Although not shown, two-core optical fiber 1B does not have inversion asymmetry with respect to fiber axis C in side observation image 3 (see FIG. 3) in which the observation direction is orthogonal to line segment L. Therefore, two cores 10 cannot be identified only by side observation image 3. Two-core optical fiber 1B has inversion asymmetry with respect to fiber axis C in side observation image 2 (see FIG. 3) in which the observation direction is parallel to line segment L. However, in side observation image 2, since the observation direction is parallel to line segment L, two cores 10 are observed in a state of overlapping with each other. Therefore, two cores 10 cannot be identified only by side observation image 2. In two-core optical fiber 1B, two cores 10 are identified using both side observation images 2 and 3.

As described above, two-core optical fiber 1B has asymmetry that breaks the inversion symmetry with respect to fiber axis C in side observation image 2 in at least one of two directions each of which is perpendicular to fiber axis C. The core identification method obtains side observation images 2 and 3 in two directions perpendicular to fiber axis C of two-core optical fiber 1B, and identifies two cores 10 based on side observation image 3 and the inversion asymmetry of two-core optical fiber 1B with respect to side observation image 2. Therefore, in two-core optical fiber 1B and the core identification method, two cores 10 can be identified by the asymmetry.

Figure 5:
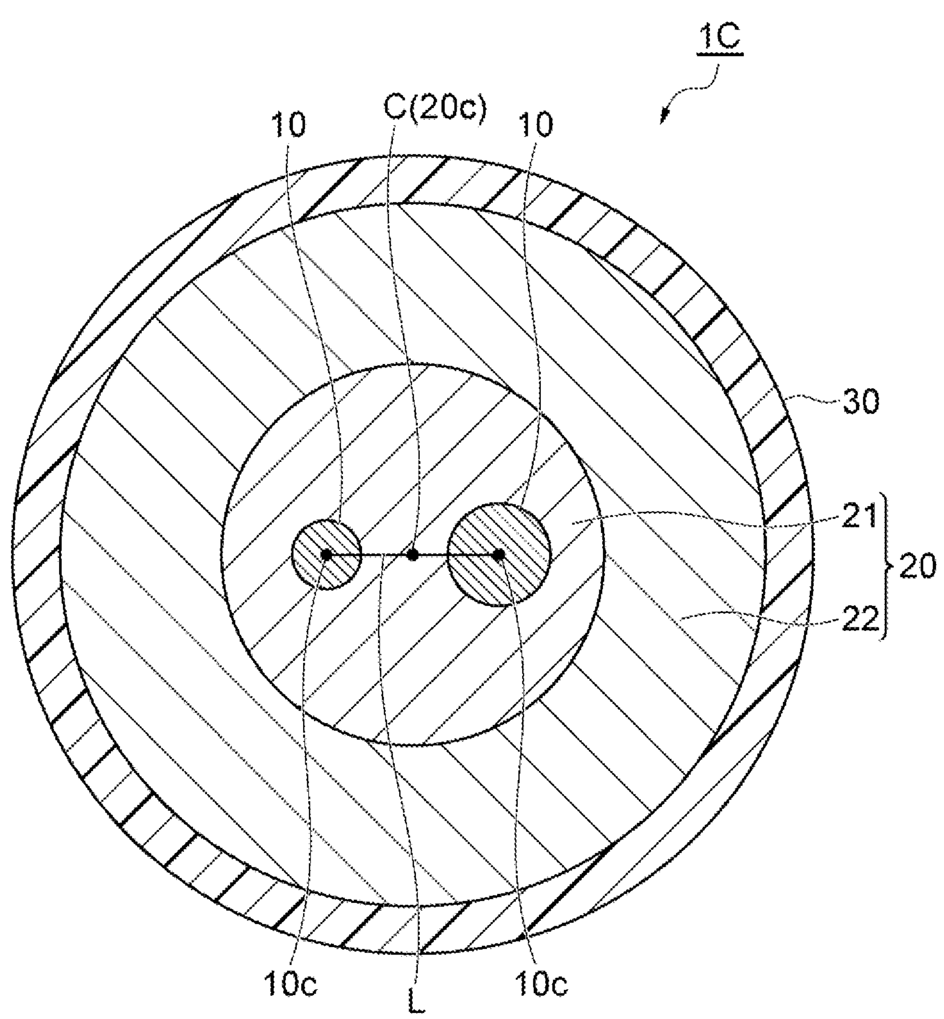
FIG. 5 is a cross-sectional view of a two-core optical fiber according to a third embodiment.

FIG. 5 is a cross-sectional view of a two-core optical fiber according to a third embodiment. As shown in FIG. 5, a two-core optical fiber 1C according to the third embodiment is different from two-core optical fiber 100 in which the core diameters (diameters) of two cores 10 are equal to each other in that the core diameters of two cores 10 are different from each other, and is the same as two-core optical fiber 100 in other points. That is, two-core optical fiber 1C includes cladding 20 including optical cladding 21 and physical cladding 22, and coating 30. Cladding 20 has rotational symmetry with respect to fiber axis C excluding a portion where two cores 10 are provided. Coating 30 has rotational symmetry with respect to fiber axis C.

The core diameter of one core 10 is equivalent to the core diameters of two cores 10 of two-core optical fiber 100. The core diameter of the other core 10 is larger than the core diameter of the one core 10. The positions of centers 10*c* of two cores 10 are the same as the positions of centers 10*c* of two cores 10 of two-core optical fiber 100. Therefore, in the cross section, the shortest distance between one core 10 and fiber axis C is longer than the shortest distance between the other core 10 and fiber axis C. Two cores 10 are similar to each other. The shortest distance between a certain point and the core is defined as the minimum value of a set of distances between all points included in the core and the certain point.

Although not shown, in side observation image 3 (see FIG. 3) in which the observation direction is orthogonal to line segment L, two cores 10 have different shapes (different widths) from each other. Two-core optical fiber 1C has no inversion symmetry with respect to fiber axis C in side observation image 3. Therefore, in two-core optical fiber 1C, cores 10 can be identified by side observation image 3. In side observation image 2 (see FIG. 3) in which the observation direction is parallel to line segment L, two cores 10 are observed in a state of overlapping with each other. Therefore, two cores 10 cannot be identified only by side observation image 2.

As described above, two-core optical fiber 1C has asymmetry that breaks the inversion symmetry with respect to fiber axis C in side observation image 3 in at least one of two directions each of which is perpendicular to fiber axis C. The core identification method obtains side observation images 2 and 3 in two directions perpendicular to fiber axis C of two-core optical fiber 1C, and identifies two cores 10 based on the inversion asymmetry of two-core optical fiber 1C with respect to side observation image 3. Therefore, in two-core optical fiber 1C and the core identification method, two cores 10 can be identified by the inversion asymmetry.

Figure 6:
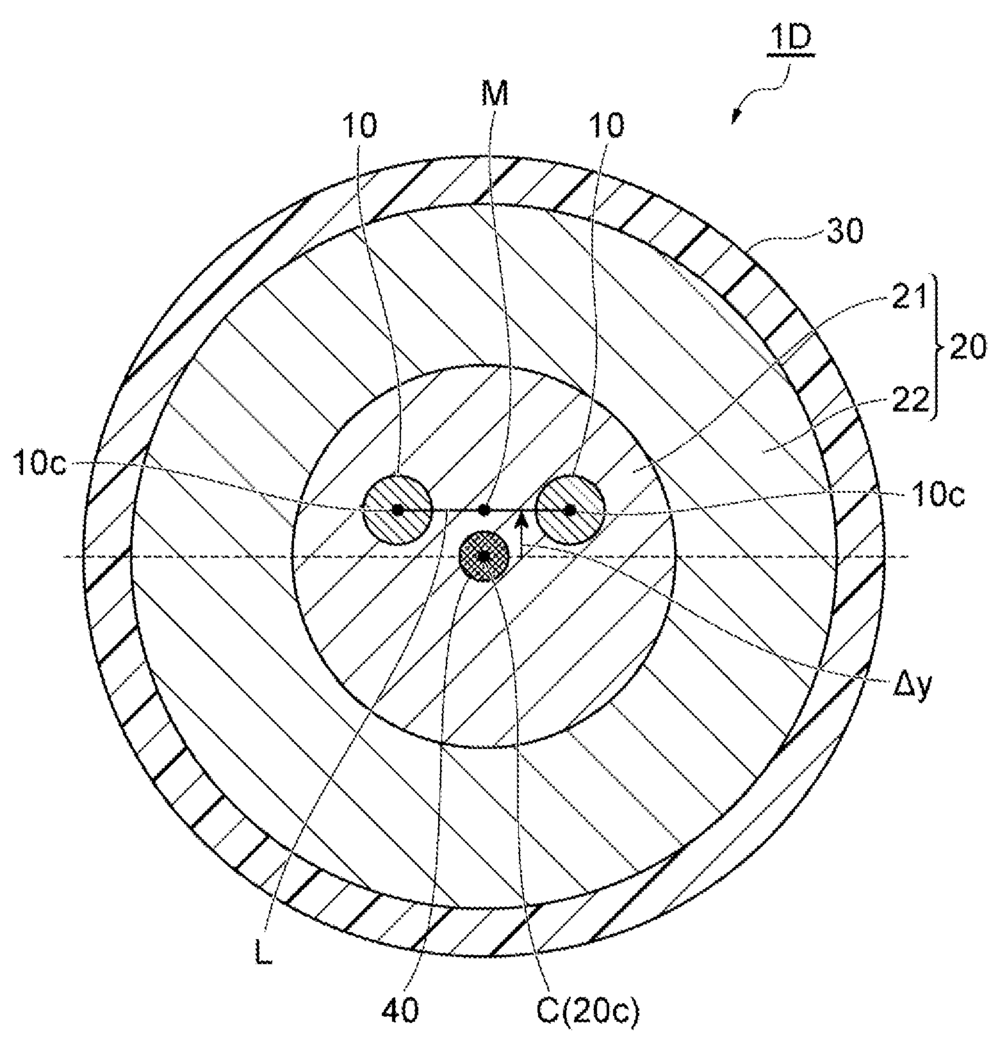
FIG. 6 is a cross-sectional view of a two-core optical fiber according to a fourth embodiment.

FIG. 6 is a cross-sectional view of a two-core optical fiber according to a fourth embodiment. As shown in FIG. 6, a two-core optical fiber 1D according to the fourth embodiment is different from two-core optical fiber 1B in that two-core optical fiber 1D includes a low-refractive-index portion 40, and is identical to two-core optical fiber 1B in other respects. Low-refractive-index portion 40 is disposed in optical cladding 21. Low-refractive-index portion 40 has a refractive index lower than the refractive index of optical cladding 21. Low-refractive-index portion 40 is made from, for example, silica glass containing fluorine. The diameter of low-refractive-index portion 40 is, for example, smaller than the core diameter (diameter) of core 10.

Low-refractive-index portion 40 is provided between two cores 10 in the cross section. Specifically, low-refractive-index portion 40 is disposed so as to overlap fiber axis C in the cross section. Low-refractive-index portion 40 has a circular shape in the cross section, and is disposed such that the center thereof overlaps fiber axis C. Cladding 20 has rotational symmetry with respect to fiber axis C excluding a portion where two cores 10 and low-refractive-index portion 40 are located.

Although not shown, similarly to two-core optical fiber 1, two-core optical fiber 1D does not have inversion asymmetry with respect to fiber axis C in side observation image 3 (see FIG. 3) and has inversion asymmetry with respect to fiber axis C in side observation image 2 (see FIG. 3). In side observation image 2, since the observation direction is parallel to line segment L, two cores 10 are observed in a state of overlapping each other. Therefore, in two-core optical fiber 1D, two cores 10 are identified using both side observation images 2 and 3.

As described above, two-core optical fiber 1D has asymmetry that breaks the inversion symmetry with respect to fiber axis C in side observation image 2 in at least one of two directions each of which is perpendicular to fiber axis C. The core identification method obtains side observation images 2 and 3 in two directions perpendicular to fiber axis C of two-core optical fiber 1D, and identifies two cores 10 based on the inversion asymmetry of two-core optical fiber 1D with respect to side observation image 2 and side observation image 3. Therefore, in two-core optical fiber 1D and the core identification method, two cores 10 can be identified by the inversion asymmetry.

Two-core optical fiber 1D includes low-refractive-index portion 40. Therefore, crosstalk between signals propagating through two cores 10 sandwiching the low-refractive-index portion can be suppressed. As a result, the core-to-core distance required to ensure a certain crosstalk characteristic can be reduced, so that the connection loss caused by the rotational angle deviation around fiber axis C at the time of fiber connection can be reduced. The smaller the distance between fiber axis C and center 10*c* of core 10 is, the smaller the positional deviation amount of center 10*c* with respect to a certain rotation angle around fiber axis C is. Therefore, as described above, it is possible to reduce the connection loss caused by the angular deviation. Since low-refractive-index portion 40 is disposed so as to overlap fiber axis C, it does not function as a marker for identifying core 10.

Figure 7:
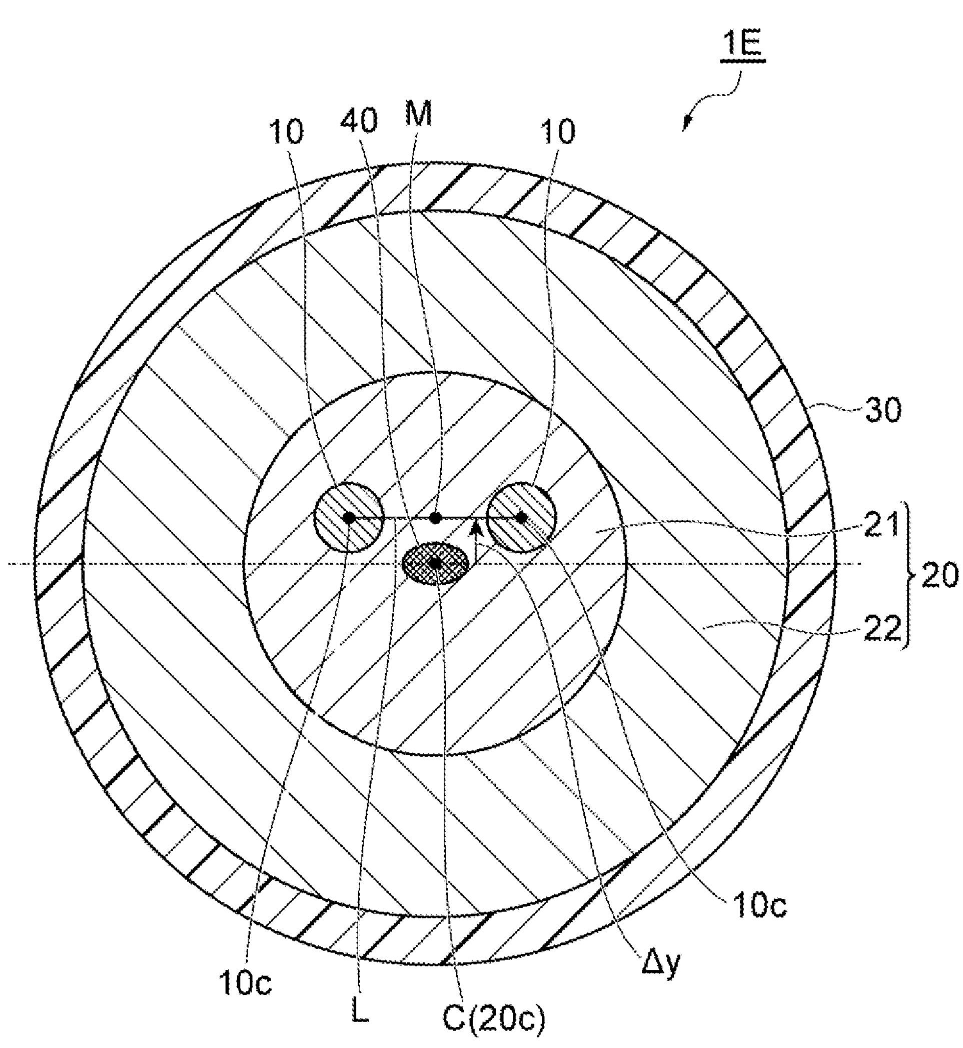
FIG. 7 is a cross-sectional view of a two-core optical fiber according to a fifth embodiment.

FIG. 7 is a cross-sectional view of a two-core optical fiber according to a fifth embodiment. As shown in FIG. 7, a two-core optical fiber 1E according to the fifth embodiment is different from two-core optical fiber 1D in the shape of low-refractive-index portion 40, and is the same as two-core optical fiber 1D in other respects. Low-refractive-index portion 40 has an oval shape in which a non-circularity of greater than 0% and 10% or less in the cross section, and is disposed such that the major axis is parallel to line segment L. The length of the major axis of low-refractive-index portion 40 is, for example, equivalent to the core diameter of core 10.

Two-core optical fiber 1E has asymmetry that breaks the inversion symmetry with respect to fiber axis C in side observation image 2 in at least one of two directions each of which is perpendicular to fiber axis C. The core identification method obtains side observation images 2 and 3 in two directions perpendicular to fiber axis C of two-core optical fiber 1E, and identifies two cores 10 based on the inversion asymmetry of two-core optical fiber 1E with respect to side observation image 2 and side observation image 3. Therefore, in two-core optical fiber 1E and the core identification method, two cores 10 can be identified by the inversion asymmetry.

In two-core optical fiber 1E, by making the cross-sectional shape of low-refractive-index portion 40 flat, the interval between core 10 and low-refractive-index portion 40 can be narrowed as compared with the case of a perfect circle while keeping the cross-sectional area of low-refractive-index portion 40 constant. As a result, it is possible to enhance the crosstalk suppression effect between signals transmitted through two cores 10 sandwiching the low-refractive-index portion. The non-circularity may be 6% to 10%. In this case, the crosstalk suppression effect can be further enhanced. Since the cross-sectional area of low-refractive-index portion 40 is suppressed as compared with the case where the cross section shape of low-refractive-index portion 40 is a perfect circle, the manufacturing cost is also suppressed. In addition, the influence of low-refractive-index portion 40 on the optical characteristics of two-core optical fiber 1E is also suppressed.

Figure 8:
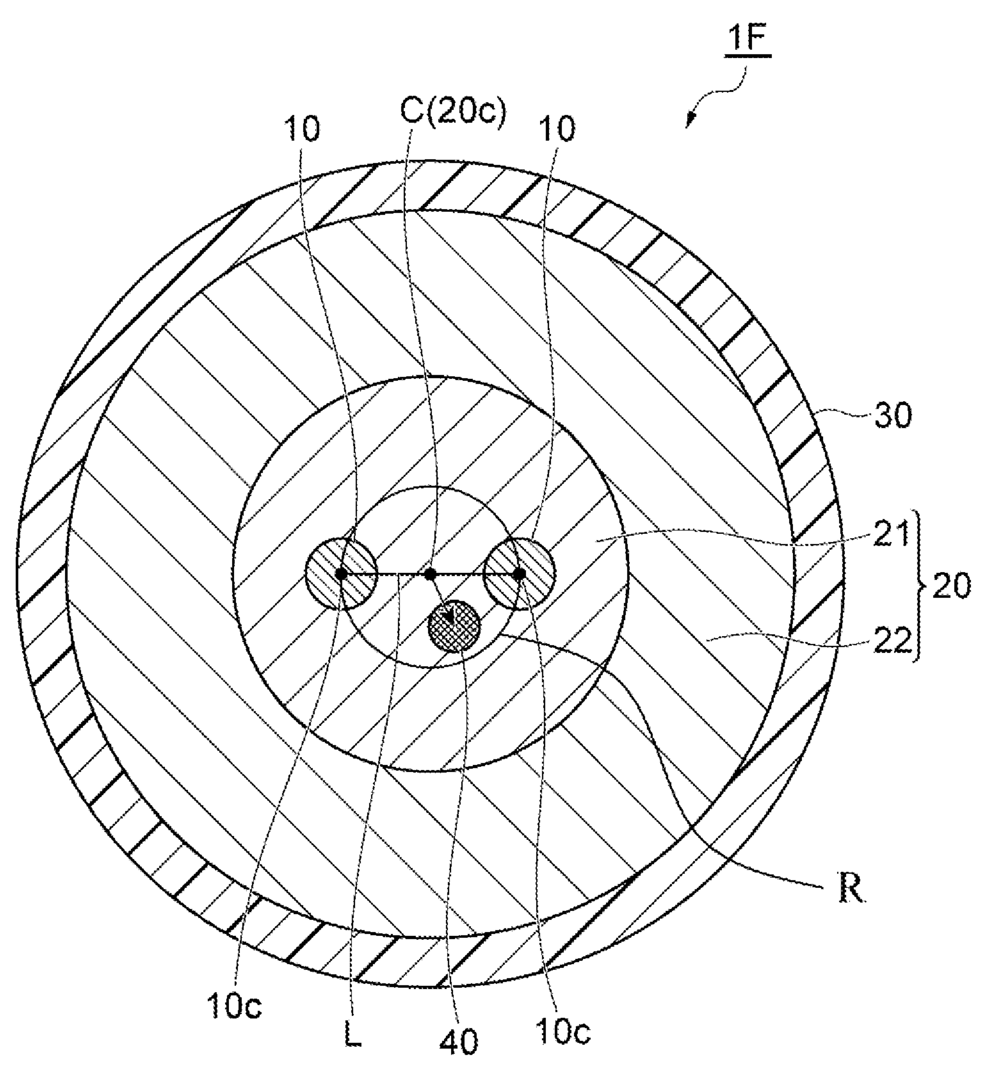
FIG. 8 is a cross-sectional view of a two-core optical fiber according to a sixth embodiment.

FIG. 8 is a cross-sectional view of a two-core optical fiber according to a sixth embodiment. As shown in FIG. 8, a two-core optical fiber 1F according to the sixth embodiment is different from two-core optical fiber 100 in that two-core optical fiber 1F includes low-refractive-index portion 40, and is the same as two-core optical fiber 100 in other respects. Low-refractive-index portion 40 is disposed in optical cladding 21. Low-refractive-index portion 40 has a refractive index lower than the refractive index of optical cladding 21. Low-refractive-index portion 40 is made from, for example, silica glass containing fluorine. The diameter of low-refractive-index portion 40 is, for example, shorter than the core diameter (diameter) of core 10. Low-refractive-index portion 40 has a circular shape in the cross section, but may have an oval shape. In this case, low-refractive-index portion 40 may have an oval shape in which the non-circularity is greater than 0% and 10% or less, and may be disposed such that the major axis is parallel to line segment L. The non-circularity may be 6% to 10%.

Low-refractive-index portion 40 is disposed between two cores 10 in the cross section. Specifically, in the cross section, low-refractive-index portion 40 is provided in a circle R, the center being centered on fiber axis C and having a circumference passing through the center of one of two cores 10 that is closest to fiber axis C. In two-core optical fiber 1F, the distances from two cores 10 to fiber axis C are equal to each other. Therefore, Circle R is centered on fiber axis C and passes through each of centers 10*c* of two cores 10.

Low-refractive-index portion 40 is spaced apart from fiber axis C in the cross section. Low-refractive-index portion 40 is spaced apart from fiber axis C in each of a direction parallel to line segment L and a direction orthogonal to line segment L in the cross section. Cladding 20 has rotational symmetry with respect to fiber axis C excluding a portion where two cores 10 and low-refractive-index portion 40 are located.

Although not shown, in two-core optical fiber 1F, low-refractive-index portion 40 is disposed at a position different from fiber axis C in each of side observation images 2 and 3 (see FIG. 3). Therefore, although two cores 10 are disposed at positions of inversion symmetry with respect to fiber axis C, two-core optical fiber 1F has inversion asymmetry with respect to fiber axis C in each of side observation images 2 and 3. That is, in two-core optical fiber 1F, side observation images 2 and 3 can be made different from each other and two cores 10 can be distinguished from each other even if two cores 10 are not disposed at inversion asymmetrical positions.

As described above, two-core optical fiber 1F has asymmetry that breaks the inversion symmetry with respect to fiber axis C in side observation images 2 and 3 in the two directions perpendicular to fiber axis C. The core identification method obtains side observation images 2 and 3 in two directions perpendicular to fiber axis C of two-core optical fiber 1F, and identifies two cores 10 based on the inversion asymmetry of two-core optical fiber 1F with respect to side observation images 2 and 3. Therefore, in two-core optical fiber 1F and the core identification method, two cores 10 can be identified by the inversion asymmetry.

Although embodiments have been described above, the present disclosure is not necessarily limited to the above-described embodiments, and various modifications can be made without departing from the scope of the present disclosure. For example, there may be two or more cores.

In the cross section, midpoint M may be spaced apart from fiber axis C in at least one of the direction parallel to line segment L and the direction orthogonal to line segment L, or may be spaced apart from fiber axis C in each of the direction parallel to line segment L and the direction orthogonal to line segment L.

In two-core optical fiber 1C, two cores 10 are similar to each other, but may not be similar to each other. For example, the cross-sectional shape of the other core 10 may be other than a circular shape.

REFERENCE SIGNS LIST

1A, 1B, 1C, 1D, 1E, 1F, 100 two-core optical fiber,
2, 3 side observation image,
10 core,
10*c* center,
20 cladding,
20*c* center,
21 optical cladding,
22 physical cladding,
30 coating,
40 low-refractive-index portion,
C fiber axis,
L line segment,
M midpoint
R circle

What is claimed is:

1. A multi-core optical fiber comprising:
a plurality of cores extending along a fiber axis;
a cladding including the plurality of cores formed in the cladding, the cladding having rotational symmetry with respect to the fiber axis excluding a portion of the cladding where the plurality of cores are located; and
a coating surrounding the cladding and having rotational symmetry with respect to the fiber axis,
wherein the multi-core optical fiber has inversion asymmetry with respect to the fiber axis in a side observation image in at least one of two directions each of which is perpendicular to the fiber axis,
wherein at least one core of the plurality of cores has a shape different from a shape of another core included in the plurality of cores in the side observation image.

2. The multi-core optical fiber according to claim 1,
wherein a centroid of a group of the plurality of cores is spaced apart from the fiber axis in a cross section perpendicular to the fiber axis.

3. The multi-core optical fiber according to claim 1,
wherein the plurality of cores are two cores.

4. A core identification method comprising:
obtaining side observation images in two directions each of which is perpendicular to the fiber axis of the multi-core optical fiber according to claim 1; and
identifying the plurality of cores based on inversion asymmetry with respect to the fiber axis in each of the side observation images.

5. The core identification method according to claim 4,
wherein the two directions are perpendicular to each other.

6. A multi-core optical fiber comprising:
a plurality of cores extending along a fiber axis;
a cladding including the plurality of cores formed in the cladding, the cladding having rotational symmetry with respect to the fiber axis excluding a portion of the cladding where the plurality of cores are located;
a coating surrounding the cladding and having rotational symmetry with respect to the fiber axis; and
a low-refractive-index portion having a refractive index lower than a refractive index of the cladding,
wherein the multi-core optical fiber has inversion asymmetry with respect to the fiber axis in a side observation image in at least one of two directions each of which is perpendicular to the fiber axis,
wherein the low-refractive-index portion is disposed at a position overlapping the fiber axis in a cross section perpendicular to the fiber axis, and
wherein the cladding, excluding a portion of the cladding where the plurality of cores and the low-refractive-index portion are located, has rotational symmetry with respect to the fiber axis.

7. The multi-core optical fiber according to claim 6,
wherein the low-refractive-index portion has an oval shape with a non-circularity of greater than 0% and 10% or less in a cross section perpendicular to the fiber axis.

8. The multi-core optical fiber according to claim 7,
wherein the non-circularity is 6% to 10%.

9. The multi-core optical fiber according to claim 6,
wherein a centroid of a group of the plurality of cores is spaced apart from the fiber axis in a cross section perpendicular to the fiber axis.

10. The multi-core optical fiber according to claim 6,
wherein the plurality of cores have an identical shape in the side observation image.

11. The multi-core optical fiber according to claim 6,
wherein the plurality of cores are two cores.

12. A multi-core optical fiber comprising:
a plurality of cores extending along a fiber axis;
a low-refractive-index portion provided in a circle, the circle being centered on the fiber axis and having a circumference passing through a center of one of the plurality of cores that is closest to the fiber axis, in a cross section perpendicular to the fiber axis;
a cladding including the plurality of cores and the low-refractive-index portion formed in the cladding, the cladding having rotational symmetry with respect to the fiber axis excluding a portion of the cladding where the plurality of cores and the low-refractive-index portion are located; and
a coating surrounding the cladding and having rotational symmetry with respect to the fiber axis,
wherein the multi-core optical fiber has inversion asymmetry with respect to the fiber axis in a side observation image in at least one of two directions each of which is perpendicular to the fiber axis.

* * * * *